US012039940B2

(12) United States Patent
Sang et al.

(10) Patent No.: US 12,039,940 B2
(45) Date of Patent: Jul. 16, 2024

(54) LIGHT-EMITTING DISPLAY DEVICE

(71) Applicant: LG Display Co., Ltd., Seoul (KR)

(72) Inventors: Woo Kyu Sang, Paju-si (KR); Moon Soo Chung, Paju-si (KR); Tae Hun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/336,734

(22) Filed: Jun. 16, 2023

(65) Prior Publication Data

US 2024/0161705 A1 May 16, 2024

(30) Foreign Application Priority Data

Nov. 14, 2022 (KR) ........................ 10-2022-0151469

(51) Int. Cl.
*G09G 3/32* (2016.01)
*G09G 3/3266* (2016.01)
*G09G 3/3291* (2016.01)

(52) U.S. Cl.
CPC ......... *G09G 3/3291* (2013.01); *G09G 3/3266* (2013.01); *G09G 2310/0278* (2013.01); *G09G 2310/061* (2013.01); *G09G 2320/0247* (2013.01); *G09G 2330/021* (2013.01)

(58) Field of Classification Search
CPC ............... G09G 3/3291; G09G 3/3266; G09G 2310/0278; G09G 2310/061; G09G 2320/0247; G09G 2330/021
See application file for complete search history.

(56) References Cited

U.S. PATENT DOCUMENTS

2011/0292015 A1* 12/2011 Komiya ................. G09G 3/003 345/76
2012/0146979 A1* 6/2012 Kim ..................... G09G 3/3233 345/76
2022/0122534 A1* 4/2022 Kim ..................... G09G 3/3233
2022/0139301 A1* 5/2022 Kim ..................... G09G 3/3233 345/690
2023/0115779 A1* 4/2023 Kim ..................... G09G 3/3233 345/55
2023/0154411 A1* 5/2023 Lee ...................... G09G 3/2092 345/204
2023/0196998 A1* 6/2023 Han ..................... G09G 3/3233 345/212
2023/0368735 A1* 11/2023 Han ..................... G09G 3/3208
2023/0402014 A1* 12/2023 Kim .................... G06F 3/04184

* cited by examiner

*Primary Examiner* — Dmitriy Bolotin
(74) *Attorney, Agent, or Firm* — Fenwick & West LLP

(57) ABSTRACT

A light-emitting display device includes a display panel including a plurality of subpixels each including a light-emitting element, a data driver configured to supply a data voltage and a reset voltage to each of the subpixels, and a scan driver configured to output an emission signal for controlling a non-emission period and an emission period of the light-emitting element and a reset signal for controlling a reset period of each of the subpixels, wherein the scan driver outputs the emission signal a plurality of times in one frame period and outputs the reset signal a plurality of times in a non-emission period according to the emission signal, and at least one of a plurality of emission signals or a plurality of reset signals has at least one of a different delay period or a different pulse width.

17 Claims, 8 Drawing Sheets

FIG. 3
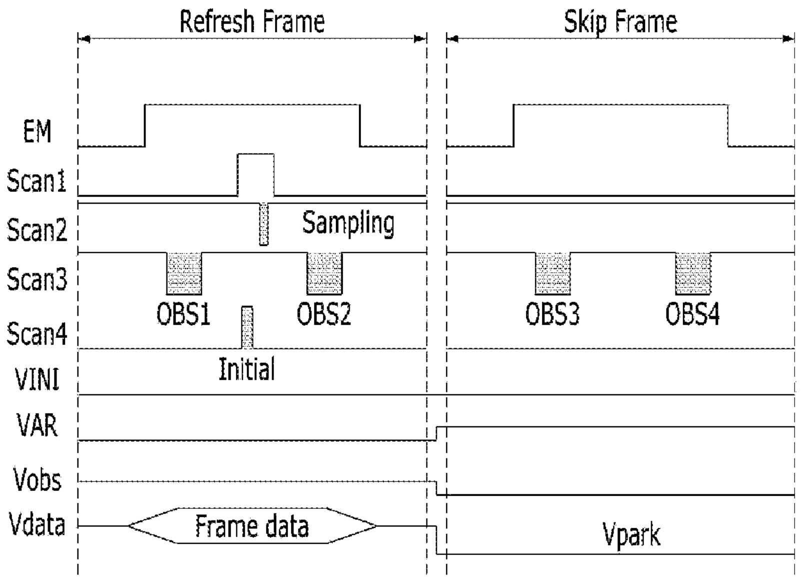
FIG. 4A
FIG. 4B
FIG. 4C
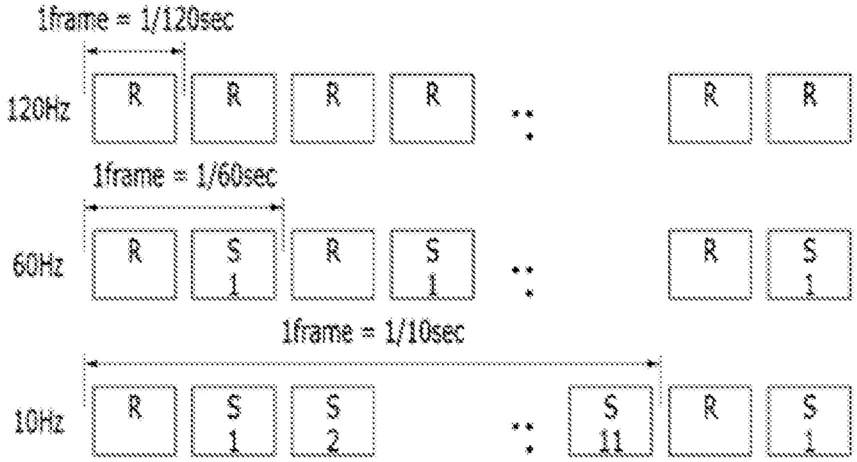

LIGHT-EMITTING DISPLAY DEVICE

CROSS-REFERENCE TO RELATED APPLICATION

This application claims the benefit of Republic of Korea Patent Application No. 10-2022-0151469, filed on Nov. 14, 2022, which is hereby incorporated by reference in its entirety.

BACKGROUND

Field of Technology

The present disclosure relates to a light-emitting display device.

Discussion of the Related Art

An electroluminescent display device is divided into an inorganic light-emitting display device and an electroluminescent display device according to a material of an emission layer. Each pixel of the electroluminescent display device may include a light-emitting element that emits light by itself and at least one transistor for driving the light-emitting element.

As information technology develops, importance of a display device, which is a connection medium between a user and information, has been increasing, and a method of improving image quality of the display device has been required.

SUMMARY

Accordingly, the present disclosure is directed to a light-emitting display device that substantially obviates one or more problems due to limitations and disadvantages of the related art.

An object of the present disclosure is to provide a light-emitting display device having improved image quality by reducing flickering.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a light-emitting display device includes a display panel including a plurality of subpixels each including a light-emitting element, a data driver configured to supply a data voltage and a reset voltage to each of the subpixels, and a scan driver configured to output an emission signal for controlling a non-emission period and an emission period of the light-emitting element and a reset signal for controlling a reset period of each of the subpixels, wherein the scan driver outputs the emission signal a plurality of times in one frame period and outputs the reset signal a plurality of times in a non-emission period according to the emission signal, and at least one of a plurality of emission signals or a plurality of reset signals has at least one of a different delay period or a different pulse width.

A delay time of each of the plurality of emission signals may gradually increase, and the same reset signal may be output for each of a plurality of non-emission periods according to the plurality of emission signals.

The plurality of emission signals may have the same delay time, a last emission signal among the plurality of emission signals may have a longer pulse width in a non-emission period and a shorter emission period when compared to the other emission signals, and the same reset signal may be output for each of a plurality of non-emission periods according to the plurality of emission signals.

A first emission signal, a second emission signal, a third emission signal, and a fourth emission signal each having the same pulse width in a non-emission period may be sequentially output in the one frame period, the third emission signal may be delayed and output, and the reset signal may be output in a non-emission period according to the first emission signal and the third emission signal.

The scan driver may perform refresh frame driving for charging the subpixels with data voltages during a low-speed driving period and skip frame driving for maintaining the data voltages, and output the emission signal a plurality of times in a refresh frame period and a skip frame period.

A reset signal output in a non-emission period of the refresh frame period may be different from a reset signal output in a non-emission period of the skip frame period.

The reset signal output in the non-emission period of the refresh frame period may be different in pulse width from the reset signal output in the non-emission period of the skip frame period.

The number of reset signals output in the non-emission period of the refresh frame period may be different from the number of reset signals output in the non-emission period of the skip frame period.

A first emission signal, a second emission signal, a third emission signal, and a fourth emission signal each having the same pulse width in a non-emission period may be sequentially output in each of the refresh frame period and the skip frame period, and the reset signal may be output in a non-emission period according to the first emission signal and the third emission signal.

Each of the subpixels may include the light-emitting element, a driving thin film transistor (TFT) configured to apply a current to a first electrode of the light-emitting element, an emission control TFT configured to receive input of the emission signal to connect the light-emitting element and the driving TFT to each other, and a first switching TFT configured to receive input of the reset signal to apply the reset voltage to the first electrode of the light-emitting element.

Each of the subpixels may further include a second switching TFT configured to receive input of the reset signal to apply an on-bias stress voltage to the emission control TFT.

In another aspect of the present disclosure, a light-emitting display device includes a display panel including a plurality of subpixels, wherein each of the plurality of subpixels includes a driving TFT including a first electrode connected to a first node, a second electrode connected to a second node, and a gate electrode connected to a third node, a light-emitting element including an anode connected to a fourth node and a cathode connected to a low-potential voltage, a first emission control TFT and a second emission control TFT, the first emission control TFT including a gate electrode to which an emission signal is input to supply a high-potential voltage to the first node according to the emission signal, and the second emission control TFT connecting the second node and the fourth node to each other, a first switching TFT turned on by a first scan signal to apply a data voltage signal to the first node, a second switching TFT turned on by a second scan signal to connect the second node and the third node to each other, thereby diode-connecting the driving TFT, a third switching TFT turned on by a third scan signal to apply an initialization voltage to the third node, a fourth switching TFT turned on by a fourth scan signal to apply an anode reset voltage to the fourth node, and a fifth switching TFT turned on by the fourth scan signal to apply an on-bias stress voltage to the first node, and the emission signal is output a plurality of times in one frame period, the fourth scan signal is output a plurality of times in a non-emission period according to the emission signal, and at least one of a plurality of emission signals or a plurality of fourth scan signals has at least one of a different delay period or a different pulse width.

Each of the second switching TFT and the third switching TFT may be implemented as an n-type oxide transistor.

Each of the driving TFT, the first emission control TFT, the second emission control TFT, the first switching TFT, the fourth switching TFT, and the fifth switching TFT may be implemented as a p-type low-temperature polycrystalline silicon (LTPS) transistor.

During refresh frame driving, in a non-emission period, a driving period of each of the plurality of subpixels may include an initialization period in which the second scan signal is input at a turn-on level so that the driving TFT is diode-connected, and the third scan signal is input at a turn-on level so that the initialization voltage is applied to the third node, a sampling period in which the second scan signal is input at a turn-on level so that the driving TFT is diode-connected, and the first scan signal is input at a turn-on level so that the data voltage signal is applied to the first node, and at least one on-bias stress period in which, as the fourth scan signal is input at a turn-on level, the anode reset voltage is applied to the fourth node, and the on-bias stress voltage is applied to the first node.

During skip frame driving, in a non-emission period, the driving period of each of the plurality of subpixels may include at least one on-bias stress period in which, as the fourth scan signal is input at a turn-on level, the anode reset voltage is applied to the fourth node, and the on-bias stress voltage is applied to the first node.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a diagram illustrating driving waveforms of the subpixel of FIG. 2 according to an embodiment of the present disclosure;

FIGS. 4A, 4B, and 4C and 5A, 5B, and 5C are diagrams for describing a variable refresh rate (VRR) driving method of the light-emitting display device according to an embodiment of the present disclosure;

DETAILED DESCRIPTION

Figure 1:
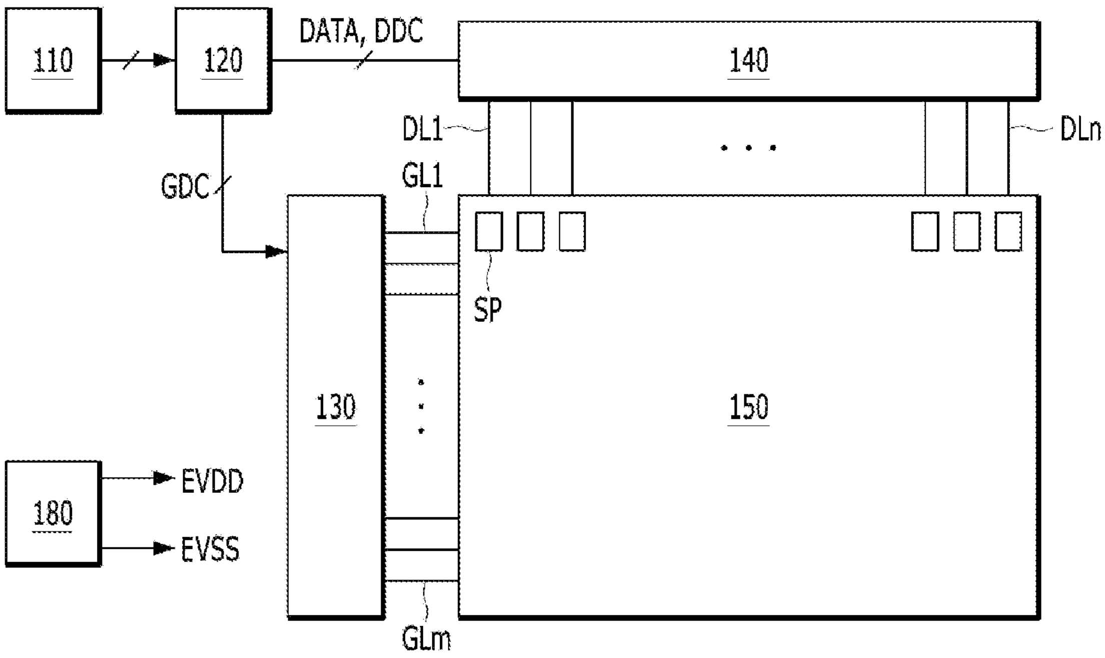
FIG. 1 is a block diagram schematically illustrating a configuration of a light-emitting display device according to an embodiment of the present disclosure.

The advantages and features of the present disclosure, and the method for achieving the advantages and features will become apparent with reference to embodiments described below in detail in conjunction with the accompanying drawings. However, the present disclosure is not limited to the embodiments disclosed below and may be implemented in a variety of different forms, and these embodiments allow the present disclosure to be complete and are provided to fully inform those of ordinary skill in the art to which the present disclosure belongs of the scope of the disclosure.

The shapes, sizes, proportions, angles, numbers, etc. disclosed in the drawings for describing the embodiments of the present disclosure are illustrative, and thus the present disclosure is not limited to the illustrated elements. The same reference symbol refers to the same element throughout the specification. When “including”, “having”, “comprising”, etc. are used in this specification, other parts may also be present, unless “only” is used. When an element is expressed in the singular, the case including the plural is included unless explicitly stated otherwise.

In interpreting an element, it is to be interpreted as including an error range even when there is no separate explicit description thereof.

In the case of a description of a positional relationship, for example, when a positional relationship between two parts is described using “on”, “above”, “below”, “next to”, etc., one or more other parts may be located between the two parts, unless “immediately” or “directly” is used.

Although “first”, “second”, etc. are used to describe various elements, these elements are not limited by these terms. These terms are merely used to distinguish one element from another. Accordingly, a first element mentioned below may be a second element within the spirit of the present disclosure.

In addition, a pixel circuit and a gate driver of a light-emitting display device described below may each include a plurality of transistors. The transistors may be implemented as oxide TFTs (thin film transistors) including oxide semiconductors, LTPS (low-temperature polycrystalline silicon) TFTs including LTPS, etc. Each of the transistors may be implemented with a p-channel TFT or an n-channel TFT.

A transistor is a three-electrode element including a gate, a source, and a drain. The source is an electrode that supplies a carrier to the transistor. Within the transistor, the carrier starts flowing from the source. The drain is an electrode through which the carrier exits the transistor. The carrier flows through the transistor flows from the source to the drain. In the case of an n-channel transistor, the carrier is an electron, and thus a source voltage is lower than a drain voltage so that the electron may flow from the source to the drain. A direction of current in an n-channel transistor is from the drain to the source. In the case of a p-channel transistor, the carrier is a hole, and thus the source voltage is higher than the drain voltage so that the hole may flow from the source to the drain. In the p-channel transistor, since the hole flows from the source to the drain, current flows from the source to the drain. It should be noted that the source and drain of the transistor are not fixed. For example, the source and drain may change depending on the applied voltage. Therefore, the disclosure is not limited by the source and drain of the transistor. In the following description, the source and drain of the transistor will be referred to as a first electrode and a second electrode.

A gate signal swings between a gate-on voltage and a gate-off voltage. The gate-on voltage is set to a voltage higher than a threshold voltage of the transistor, and the gate-off voltage is set to a voltage lower than the threshold voltage of the transistor. The transistor is turned on in response to the gate-on voltage, while being turned off in response to the gate-off voltage. In the n-channel transistor, the gate-on voltage may be a gate-high voltage VGH, and the gate-off voltage may be a gate-low voltage VGL. In the p-channel transistor, the gate-on voltage may be a gate-low voltage VGL, and the gate-off voltage may be a gate-high voltage VGH.

Each of pixels of an electroluminescent display device includes a light-emitting element and a driving element that drives the light-emitting element by generating a pixel current according to a voltage between the gate and the source. The light-emitting element includes an anode, a cathode, and an organic compound layer formed between these electrodes. The organic compound layer may include a hole injection layer HIL, a hole transport layer HTL, an emission layer EML, an electron transport layer ETL, an electron injection layer EIL, etc. However, the disclosure is not limited thereto. When a pixel current flows through the light-emitting element, a hole passing through the hole transport layer HTL and an electron passing through the electron transport layer ETL move to the emission layer EML to form an exciton, and as a result, the emission layer EML may emit visible light.

Recently, an increasing number of attempts have been made to implement some of transistors included in a pixel circuit of the electroluminescent display device as oxide transistors. An oxide transistor uses an oxide referred to as IGZO, which is a combination of In (indium), Ga (gallium), Zn (zinc), and O (oxygen), instead of polysilicon as a semiconductor material.

The oxide transistor has lower electron mobility than that of a low-temperature poly-silicon (hereinafter referred to as LTPS) transistor, and has 10 or more times higher electron mobility than that of an amorphous silicon transistor. In terms of manufacturing cost, the oxide transistor is much more advantageous over the LTPS transistor while manufacturing cost of the oxide transistor is higher than that of the amorphous silicon transistor. In addition, a manufacturing process of the oxide transistor is similar to that of the amorphous silicon transistor, and thus there is an advantage of efficiency since existing facilities may be utilized. In particular, the oxide transistor has a low off-current, and thus has an advantage of high driving stability and reliability during low-speed driving in which an off-period of the transistor is relatively long. Therefore, the oxide transistor may be applied to a large liquid crystal display that requires high resolution and low-power driving or an OLED TV that cannot be formed in a large screen size through an LTPS process.

Like reference numbers designate substantially like elements throughout the specification. Hereinafter, embodiments of the present disclosure will be described in detail with reference to the accompanying drawings. In the following description, when it is determined that a detailed description of a known function or configuration related to the present disclosure may unnecessarily obscure the gist of the present disclosure, the detailed description will be omitted.

FIG. 1 is a block diagram schematically illustrating a configuration of a light-emitting display device according to an embodiment of the present disclosure.

Referring to FIG. 1, the light-emitting display device may include an image supply unit 110, a timing controller 120, a scan driver 130, a data driver 140, a display panel 150, a power supply unit 180, etc.

The image supply unit 110 (e.g., a circuit) may output various driving signals together with an image data signal supplied from the outside or an image data signal stored in an internal memory. The image supply unit 110 may supply the data signal and various driving signals to the timing controller 120.

In the display panel 150, a plurality of data lines DL1 to DLn extending in a column direction (or vertical direction) and a plurality of gate lines GL1 to GLm extending in a row direction (or horizontal direction) intersect each other, and subpixels SP are disposed in a matrix in respective intersecting regions to form a pixel array. Subpixels SP disposed on the same pixel line simultaneously operate according to a scan signal and an emission signal EM applied from the same gate line GL. Each subpixel SP includes a light-emitting element and a pixel circuit that controls the amount of current applied to an anode of the light-emitting element. The pixel circuit may include a driving transistor that controls the amount of current so that a certain current may flow through the light-emitting element. The light-emitting element emits light during an emission period and does not emit light during a period other than the emission period. In a period other than the emission period, initialization and programming of the pixel circuit, reset of the light-emitting element, etc. may be performed.

The timing controller 120 may output a gate timing control signal GDC for controlling operation timing of the scan driver 130, a data timing control signal DDC for controlling operation timing of the data driver 140, various synchronization signals (a vertical synchronization signal Vsync and a horizontal synchronization signal Hsync), etc. The timing controller 120 may supply a data signal DATA supplied from the image supply unit 110 to the data driver 140 together with the data timing control signal DDC. The timing controller 120 may be formed in the form of an integrated circuit (IC) and mounted on a printed circuit board. However, the present disclosure is not limited thereto.

The data driver 140 may sample and latch the data signal DATA in response to the data timing control signal DDC supplied from the timing controller 120, convert a digital data signal into an analog data voltage based on a gamma reference voltage, and output the analog data voltage. The data driver 140 may supply data voltages to subpixels included in the display panel 150 through the data lines DL1 to DLn. The data driver 140 may be formed in the form of an IC and mounted on the display panel 150 or mounted on a printed circuit board. However, the present disclosure is not limited thereto.

The scan driver 130 may output a scan signal and an emission signal in response to the gate timing control signal GDC supplied from the timing controller 120. The scan driver 130 may supply at least one scan signal and emission signal to each of the subpixels included in the display panel 150 through the gate lines GL1 to GLm. The scan driver 130 may be formed in the form of an IC or directly formed on the display panel 150 using a gate-in-panel method.

The power supply unit 180 may convert power supplied from the outside into power required for driving the display device and output the converted power under the control of the timing controller 120. For example, the power supply unit 180 may convert power supplied from the outside into a high-potential voltage EVDD, a low-potential voltage EVSS, etc. and output the converted voltage, and may generate and output a voltage required for driving the scan driver 130 (for example, a gate voltage including a gate-high voltage and a gate-low voltage), a voltage required for driving the data driver 140 (a drain voltage including a drain voltage and a half-drain voltage), etc.

Figure 2:
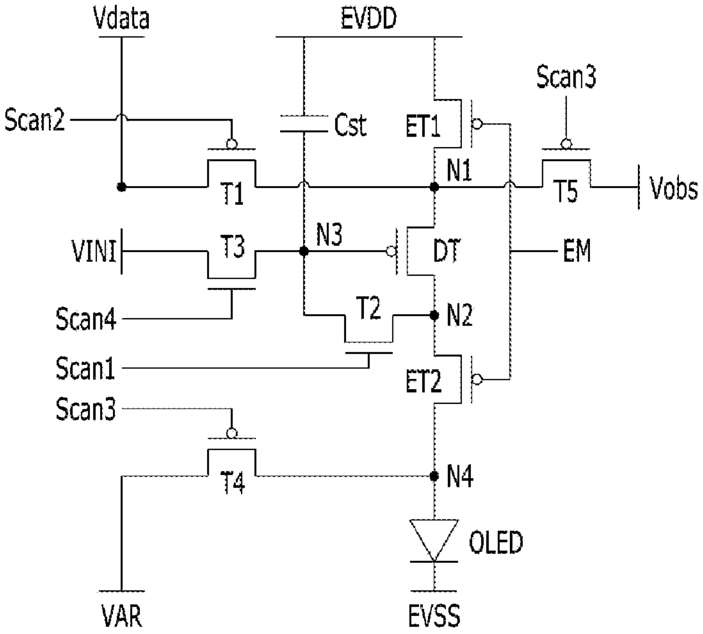
FIG. 2 is an equivalent circuit diagram of one subpixel included in the light-emitting display device of FIG. 1 according to an embodiment of the present disclosure.

FIG. 2 is an equivalent circuit diagram of one subpixel included in the light-emitting display device of FIG. 1 according to one embodiment, and FIG. 3 is a diagram illustrating driving waveforms of the subpixel of FIG. 2 according to one embodiment. In the following description, the first electrode of the transistor may be any one of a source electrode and a drain electrode, and the second electrode of the transistor may be the other one of the source electrode and the drain electrode.

One subpixel SP may be supplied with the high-potential voltage EVDD, the low-potential voltage EVSS, an initialization voltage VINI, an anode reset voltage VAR, and an on-bias stress (OBS) voltage, and may receive input of first to fourth scan signals Scan1 to Scan4, the emission signal EM, and a data voltage signal Vdata.

One subpixel SP may include a light emitting element such as an organic light-emitting diode (OLED), a driving TFT DT, a capacitor Cst, a first emission control TFT ET1, a second emission control TFT ET2, and first to fifth switching TFT T1 to T5. Each of the TFTs of the subpixel SP may be configured as a p-type MOSFET (PMOS) or an n-type MOSFET (NMOS). For example, each of the driving TFT DT, the first emission control TFT ET1, the second emission control TFT ET2, the first switching TFT T1, the fourth switching TFT T4, and a fifth switching TFT T5 may be implemented as a p-type, and each of the second switching TFT T2 and the third switching TFT T3 may be implemented as an n-type. However, the present disclosure is not limited thereto.

The OLED emits light by driving current supplied from the driving TFT DT. The OLED has an anode connected to a fourth node N4, and has a cathode connected to a wire provided with the low-potential voltage EVSS.

The driving TFT DT has a gate electrode connected to a third node N3, a first electrode connected to a first node N1, and a second electrode connected to a second node N2. The driving TFT DT may generate driving current in response to the data voltage signal Vdata. The driving TFT DT may be a PMOS, and may be implemented as an LTPS TFT.

The first emission control TFT ET1 and the second emission control TFT ET2 serve to control emission of the OLED. The first emission control TFT ET1 and the second emission control TFT ET2 are controlled so that the emission control TFTs are simultaneously turned on/off according to the emission signal EM simultaneously input to respective gate electrodes thereof. The first emission control TFT ET1 may have a first electrode connected to the high-potential voltage EVDD and a second electrode connected to the first node N1. The first emission control TFT ET1 may serve to transfer the high-potential voltage EVDD to the first electrode of the driving TFT DT in response to the emission signal EM. The second emission control TFT ET2 may have a first electrode connected to the second node N2 and a second electrode connected to the fourth node N4. The second emission control TFT ET2 may serve to transfer a driving current to the anode of the OLED in response to the emission signal EM. Each of the first emission control TFT ET1 and the second emission control TFT ET2 may be a PMOS, and may be implemented as an LTPS TFT.

The storage capacitor Cst maintains a data voltage Vdata stored in the subpixel SP for one frame. The storage capacitor Cst has one electrode connected to the third node N3 to which the gate electrode of the driving TFT DT is connected, and the other electrode connected to the high-potential voltage EVDD.

The first switching TFT T1 applies the data voltage signal Vdata to the first node N1, which is the first electrode of the driving TFT DT. The first switching TFT T1 may include a gate electrode connected to an input line of the second scan signal Scan2, a first electrode connected to a data line to which the data voltage signal Vdata is supplied, and a second electrode connected to the first node N1. The first switching TFT T1 may be a PMOS, and may be implemented as an LTPS TFT. Accordingly, the first switching TFT T1 applies the data voltage signal Vdata supplied from the data line to the first node N1, which is the first electrode of the driving TFT DT, in response to the second scan signal Scan2 at a low level, which is a turn-on voltage.

The second switching TFT T2 diode-connects the driving TFT DT by connecting the gate electrode and the drain electrode, which is the second electrode, of the driving TFT DT. The second switching TFT T2 may include a gate electrode connected to an input line of the first scan signal Scant, a first electrode connected to the third node N3, and a second electrode connected to the second node N2. The second switching TFT T2 may be an NMOS or implemented as an oxide TFT in order to minimize leakage current during a turn-off period. Accordingly, the second switching TFT T2 diode-connects the gate electrode and the drain electrode of the driving TFT DT in response to the first scan signal Scant at a high level, which is a turn-on voltage.

The third switching TFT T3 applies the initialization voltage VINI to the third node N3, which is the gate electrode of the driving TFT DT. The third switching TFT T3 may include a gate electrode connected to an input line of the fourth scan signal Scan4, a first electrode connected to the initialization voltage VINI, and a second electrode connected to the third node N3. The third switching TFT T3 may be an NMOS or implemented as an oxide TFT in order to minimize leakage current. Accordingly, the third switching TFT T3 applies the initialization voltage VINI to the third node N3, which is the gate electrode of the driving TFT DT, in response to the fourth scan signal Scan4 at a high level, which is a turn-on voltage.

The fourth switching TFT T4 applies the anode reset voltage VAR to the anode of the OLED. The fourth switching TFT T4 may include a gate electrode connected to an input line of the third scan signal Scan3, a first electrode connected to the anode reset voltage VAR, and a second electrode connected to the fourth node N4. The fourth switching TFT T4 may be a PMOS, and may be implemented as an LTPS TFT. Accordingly, the fourth switching TFT T4 applies the anode reset voltage VAR to the anode of the OLED in response to the third scan signal Scan3 at a low level, which is a turn-on voltage.

The fifth switching TFT T5 applies the on-bias stress (OBS) voltage Vobs to the first electrode of the driving TFT DT. The fifth switching TFT T5 may include a gate electrode connected to the input line of the third scan signal Scan3, a first electrode connected to the OBS voltage Vobs, and a second electrode connected to the first node N1. The fifth switching TFT T5 may be a PMOS, and may be implemented as an LTPS TFT. Accordingly, the fifth switching TFT T5 applies the OBS voltage Vobs to the first electrode of the driving TFT DT in response to the third scan signal Scan3 at a low level, which is a turn-on voltage.

A pixel current flowing through the driving transistor DT is determined by a voltage between the gate and the source of the driving transistor DT, that is, a voltage between the first node N1 and the third node N3 during the emission period. During the emission period, while a voltage of the first node N1 is fixed to the high-potential voltage EVDD, a voltage of the third node N3 is affected by off characteristics of the third switching TFT T3. A reason therefor is that the third node N3 is in a floating state due to turning-off of the third switching TFT T3 during the emission period. Accordingly, the third switching TFT T3 is implemented as an n-type oxide transistor having excellent off characteristics (that is, low off-current) in one embodiment.

In addition, the second switching TFT T2 maintaining an off state in the emission period may affect the voltage of the third node N3 due to coupling action through the storage capacitor Cst, and thus is implemented as an n-type oxide transistor having excellent off characteristics (that is, low off-current) in one embodiment. Meanwhile, the driving TFT DT generates a pixel current, and thus is implemented as a p-type LTPS transistor having excellent electron mobility characteristics in one embodiment. Likewise, each of the first emission control TFT ET1, the second emission control TFT ET2, the first switching TFT T1, the fourth switching TFT T4, and the fifth switching TFT T5 may be implemented as a p-type LTPS transistor.

Referring to FIGS. 2 and 3, an operation of the subpixel SP of the light-emitting display device according to an embodiment of the present disclosure is as follows. The subpixel may perform refresh frame driving or skip frame driving.

During refresh frame driving, in a non-emission period in which the emission signal EM is applied at an off level, each subpixel SP may program the data voltage Vdata to write image data. During skip frame driving, charging with the data voltage Vdata is not performed. Accordingly, during skip frame driving, in a non-emission period in which the emission signal EM is applied at an off level, a voltage Vpark having a constant potential with which the subpixel is not charged may be applied to the data line.

Each of a refresh frame and a skip frame may include a plurality of OBS periods (hereinafter referred to as stress periods). During a stress period, the third scan signal Scan3 is applied at a low level as a turn-on voltage. In response to the third scan signal Scan3 at a turn-on level, the fifth switching TFT T5 that applies the OBS voltage Vobs to the first node N1 of the driving TFT DT and the fourth switching TFT T4 that applies the anode reset voltage VAR to the fourth node N4, which is the anode of the OLED, are turned on. When the fourth switching TFT T4 is turned on, the anode of the OLED is reset by the anode reset voltage VAR, so that light emitting characteristics of the OLED may be maintained the same. When the fifth switching TFT T5 is turned on, the OBS voltage Vobs is applied to the driving TFT DT to alleviate a hysteresis phenomenon of the driving TFT DT. In the skip frame, since charging with the data voltage Vdata is not performed, a luminance difference may be prevented from occurring between the skip frame and the refresh frame by setting the anode reset voltage VAR to be slightly high and setting the OBS voltage Vobs to be slightly low when compared to those in the refresh frame.

A driving period of the refresh frame may include a first stress period OBS1, an initial period Initial, a sampling period Sampling, and a second stress period OBS2.

During the initial period Initial and the sampling period Sampling, the first scan signal Scant is applied at a high level, which is a turn-on voltage. The second switching TFT T2 connects the second node N2 and the third node N3 to each other in response to the first scan signal Scant at the high level, which is the turn-on voltage. Accordingly, the driving TFT DT is in a diode-connected state in which the gate electrode and the drain electrode are short-circuited to operate as a diode.

During the initial period Initial, the fourth scan signal Scan4 is applied at a high level, which is a turn-on voltage. The third switching TFT T3 is turned on by a turn-on voltage of the fourth scan signal Scan4 to apply the initialization voltage VINI to the third node N3. Since the second node N2 and the third node N3 are connected to each other, the third node N3, which is the gate electrode of the driving TFT DT and the second node N2, which is the drain electrode, are each initialized to the initialization voltage VINI. The initialization voltage VINI may be selected within a voltage range sufficiently lower than an operating voltage of the OLED, and may be set to a voltage equal to or less than the low-potential voltage EVSS.

The sampling period is a period during which a threshold voltage Vth of the driving TFT DT is sampled and the data voltage Vdata is programmed During the sampling period Sampling, the second scan signal Scan2 is applied at a low level, which is a turn-on voltage. In response to the second scan signal Scan2 at the low level, which is the turn-on voltage, the first switching TFT T1 applies the data voltage signal Vdata applied from the data line to the first node N1, which is the first electrode of the driving TFT DT. During the sampling period Sampling, the driving TFT DT is turned on and a current flows between the source and drain. Since the gate electrode and drain electrode of the driving TFT DT are in a diode-connected state, a voltage at the third node N3 rises until a voltage Vgs between the gate and the source of the driving TFT DT reaches the threshold voltage Vth due to a current flowing from the source electrode to the drain electrode. During the sampling period Sampling, the third node N3 is charged with a voltage (Vdata−|Vth|) corresponding to a difference between the data voltage Vdata and the threshold voltage Vth of the driving TFT DT.

Thereafter, when the emission signal EM is applied at a low level, which is a turn-on voltage, the first emission control TFT ET1 and the second emission control TFT ET2 are turned on. As the first emission control TFT ET1 is turned on, the high-potential voltage EVDD is applied to the first node N1. Further, as the second emission control TFT ET2 is turned on, a current path of the second node N2 and the fourth node N4 is formed. Thus, a driving current generated through the source electrode and the drain electrode of the driving TFT DT is applied to the OLED, so that light may be emitted.

In the skip frame, charging with the data voltage Vdata is not performed. Thus, the first scan signal Scant, the second scan signal Scan2, and the fourth scan signal Scan4, which are applied for driving in the initial period Initial and the sampling period Sampling, are each maintained at an off-voltage level. When driving is performed with the third scan signal Scan3 at a certain driving frequency, the skip frame includes two stress periods OBS3 and OBS4 similarly to the refresh frame.

As such, the refresh frame and skip frame may include a plurality of stress periods OBS1 to OBS4. In each of the stress periods OBS1 to OBS4, the third scan signal Scan3, which is input to the fifth switching TFT T5 that applies the OBS voltage Vobs and the fourth switching TFT T4 that applies the anode reset voltage VAR, is applied at a low level, which is a turn-on voltage, so that anode reset may be performed. Therefore, by adjusting the number of times that the third scan signal Scan3 is applied at the low level, which is the turn-on voltage, or a cycle or a signal width at which the third scan signal Scan3 is applied at the low level, which is the turn-on voltage, it is possible to adjust the anode reset number, cycle, or period.

FIGS. 4A, 4B, 4C, 5A, 5B, and 5C are diagrams for describing a variable refresh rate (VRR) driving method of the light-emitting display device according to one embodiment.

VRR driving is a driving method that allows driving at various driving frequencies from high-speed driving to low-speed driving. The light-emitting display device supplies a data voltage of an input image to data lines every frame in a basic driving mode. A low-speed driving mode may be set to reduce power consumption when the input image is not changed as much as the number of reference frames. In the low-speed driving mode, power consumption may be reduced by lowering refresh rates of pixels to control data write periods of the pixels so that the data write periods are long. When improvement of image quality is desired, a high-speed driving mode may be performed to increase a frame frequency. High-speed driving may implement a softer screen when compared to normal driving, and low-speed driving may reduce unnecessary power consumption when compared to normal driving.

Referring to FIG. 4, VRR driving may include a refresh frame and a skip frame in which a data voltage is written for each frequency.

FIG. 4A illustrates a configuration of frames during basic driving. During 120 Hz driving, 120 image frames are reproduced in 1 second, and a length of one image frame is 1/120 sec. Every image frame may be configured as a refresh frame R in which a data voltage is written.

FIG. 4B illustrates a configuration of frames during 60 Hz driving. During 60 Hz driving, 60 image frames are reproduced in 1 second. During 60 Hz driving, one image frame period is 1/60 sec, and thus one image frame may include two frames each having a length of 1/120 sec. As such, during 60 Hz driving, one image frame period may include one refresh frame R and one skip frame S. In one image frame period, the data voltage is written only in the refresh frame, and the data voltage is not applied in the remaining skip frame. Accordingly, in the skip frame, output of the data voltage is stopped, and the scan signal is minimally output, so that there is an effect of reducing power consumption.

FIG. 4C illustrates a configuration of frames during 10 Hz driving. During 10 Hz driving, 10 image frames are reproduced in 1 second. During 10 Hz driving, one image frame period is 1/10 sec, and thus one image frame may include 12 frames each having a length of 1/120 sec. As such, during 10 Hz driving, one image frame may include one refresh frame R and 11 skip frames S1 to S11. Accordingly, the data voltage is written only in one refresh frame R, and output of the data voltage is stopped and the scan signal is minimally output in the skip frames S1 to S11, so that there is an effect of reducing power consumption.

Figures 5A, 5B, 5C:
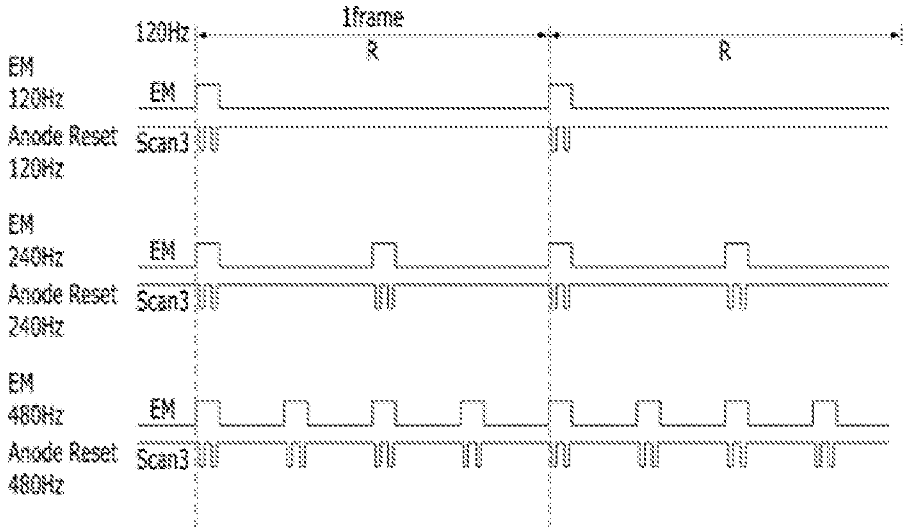

FIGS. 5A, 5B, and 5C are diagrams for describing a method of performing EM iteration driving. The light-emitting display device may perform EM iteration driving to turn on/off the emission control TFT by applying the emission signal EM a plurality of times in one frame period in order to improve image quality.

An off-level period of the emission signal EM defines the non-emission period of the OLED, and an on-level period thereof defies the emission period of the OLED. When the emission signal EM is applied at a high level, which is an off level, the first emission control TFT ET1 and the second emission control TFT ET2 are turned off. When the emission signal EM is applied at a low level, which is an on level, the first emission control TFT ET1 and the second emission control TFT ET2 are turned on, so that the OLED may emit light.

An anode reset frequency may refer to a driving frequency at which the third scan signal Scan3 input to the fourth switching TFT T4 for applying the anode reset voltage VAR is applied at a low level, which is a turn-on voltage. In the basic driving mode, since the emission signal EM is output once within one frame period, a frame driving frequency and an EM driving frequency are the same, and the anode reset frequency may be set according to the EM driving frequency. When the EM driving frequency is increased greater than the frame driving frequency, EM driving may be output a plurality of times within one frame, so that a light-emitting element may be on/off driven.

FIG. 5A illustrates setting of a driving frequency of a frame, an EM driving frequency, and an anode reset frequency in the basic driving mode.

During 120 Hz driving in which every image frame is configured as the refresh frame R, both the EM driving frequency and the anode reset frequency are set to 120 Hz. That is, the emission signal EM is output once within one frame period, and anode reset is performed during the non-emission period of the emission signal EM.

FIG. 5B illustrates a method of performing EM iteration driving. When EM driving is performed at 240 Hz by increasing the EM driving frequency and the anode reset frequency by 2 times compared to the frame frequency while maintaining 120 Hz driving for the frame frequency, the emission signal EM is output twice in one frame period, and anode reset is performed in the non-emission period of each emission signal EM.

FIG. 5C illustrates a method of performing EM driving at 480 Hz by increasing the EM driving frequency and the anode reset frequency by 4 times compared to the frame frequency while maintaining 120 Hz driving for the frame frequency. When the EM driving frequency and the anode reset frequency are each increased to 480 Hz while maintaining 120 Hz driving for the frame frequency, the emission signal EM is output 4 times in one frame period, and anode reset is performed in the non-emission period of each emission signal EM.

Figure 6:
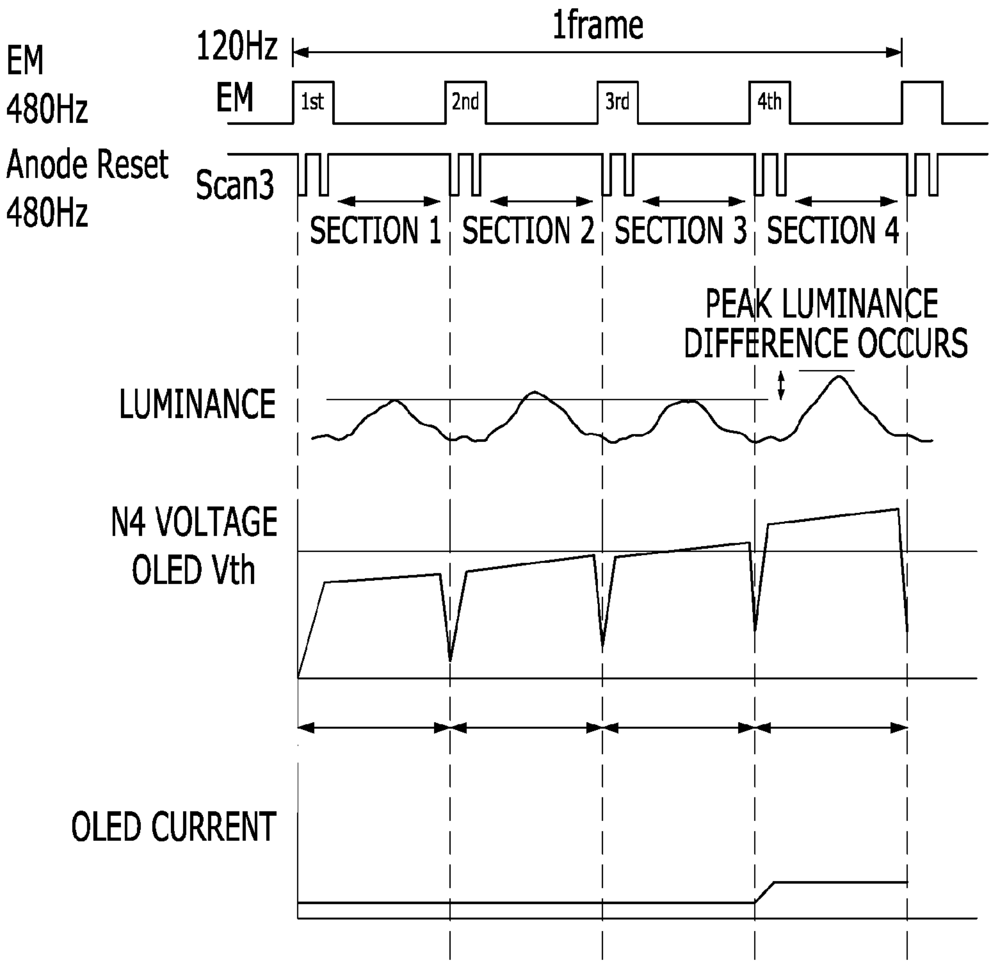
FIGS. 6 and 7 are diagrams for describing luminance changes during driving of the light-emitting display device according to an embodiment of the present disclosure.
Figure 7:
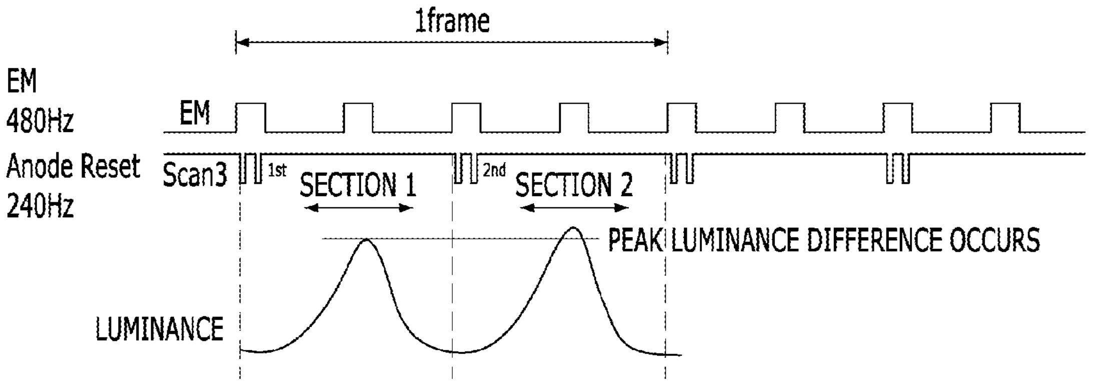

FIGS. 6 and 7 are diagrams for describing luminance changes during driving of the light-emitting display device according to one embodiment, and each illustrate luminance in each emission section according to setting of the EM driving frequency and the anode reset frequency.

FIG. 6 illustrates a luminance change in each emission section when the frame frequency is 120 Hz, and the EM driving frequency and the anode reset frequency are both 480 Hz.

When the frame frequency is 120 Hz, driving is performed with every frame as the refresh frame R. When the frame frequency is 120 Hz, and each of the EM driving frequency and the anode reset frequency is 480 Hz, the emission signal EM is output four times (first to fourth) in one frame, so that EM driving in which the OLED is turned off and then turned on is performed four times. In the non-emission period of each EM driving cycle, anode reset is performed by the third scan signal Scan3. In the refresh frame, each of the subpixels performs refresh frame driving including the first stress period OBS1, the initial period Initial, the sampling period Sampling, and the second stress period OBS2. Therefore, one EM driving cycle may include two stress periods OBS1 and OBS2, and thus anode reset is performed twice in each non-emission period.

A voltage at the fourth node N4 to which the anode of the OLED is connected is initialized during anode reset, and then the voltage at the fourth node N4 increases in the emission period of each EM driving cycle. However, during EM iteration driving, a discharging time is short, and thus a current and the voltage at the fourth node N4 gradually increase as the number of times of EM driving in which charging is performed again after refresh increases. In addition, as anode reset driving is performed with the emission signal EM at a high level, capacitance (overlap cap) is generated between an input line of the emission signal EM and the fourth node N4, and thus the voltage at the fourth node N4 increases. As a result, in a fourth section in which light is emitted by fourth EM driving, the voltage at the fourth node N4 may become higher than a threshold voltage (OLED Vth) of the OLED, and accordingly, the amount of current applied to the OLED increases, so that the luminance may be the highest in the fourth section.

FIG. 7 illustrates a luminance change in a first emission section after first anode reset and a second emission section after second anode reset when the frame frequency is 120 Hz, the EM driving frequency is 480 Hz, and the anode reset frequency is 240 Hz, which is half of the EM driving frequency according to one embodiment.

When the frame frequency is 120 Hz, driving is performed with every frame as the refresh frame R. When the frame frequency is 120 Hz, and the EM driving frequency is 480 Hz, EM driving is performed four times (first to fourth) in one frame. Anode reset is performed at 120 Hz, and thus is performed only in a first EM driving cycle and a third EM driving cycle. Since one EM driving period includes two stress periods OBS1 and OBS2, anode reset is performed twice in one EM driving period.

When anode reset is performed only in the first EM driving cycle and the third EM driving cycle among four EM driving cycles (first to fourth), since a refresh and discharging time is not sufficiently long, a voltage at the fourth node N4 after anode reset performed during the third EM driving cycle rises more than a voltage at the fourth node N4 after anode reset performed during the first EM driving cycle. As a result, a luminance difference occurs such that luminance in section 2 in which light is emitted after anode reset performed during the third EM driving cycle is higher than luminance in section 1 in which light is emitted after anode reset performed during the first EM driving cycle.

As described above with reference to FIGS. 6 and 7, when anode reset is performed together with EM iteration driving, the voltage at the fourth node N4 may rise due to the EM iteration driving, resulting in a luminance difference in each emission section. As a result, the image quality is adversely affected by flickering. Here, when anode reset is performed together with EM iteration driving, it may be confirmed that a luminance waveform has a specific tendency in each emission section. Accordingly, a section in which the highest luminance is measured may be specified, and thus flickering may be relieved by controlling the luminance difference in each section so that the luminance difference decreases.

Figure 8:
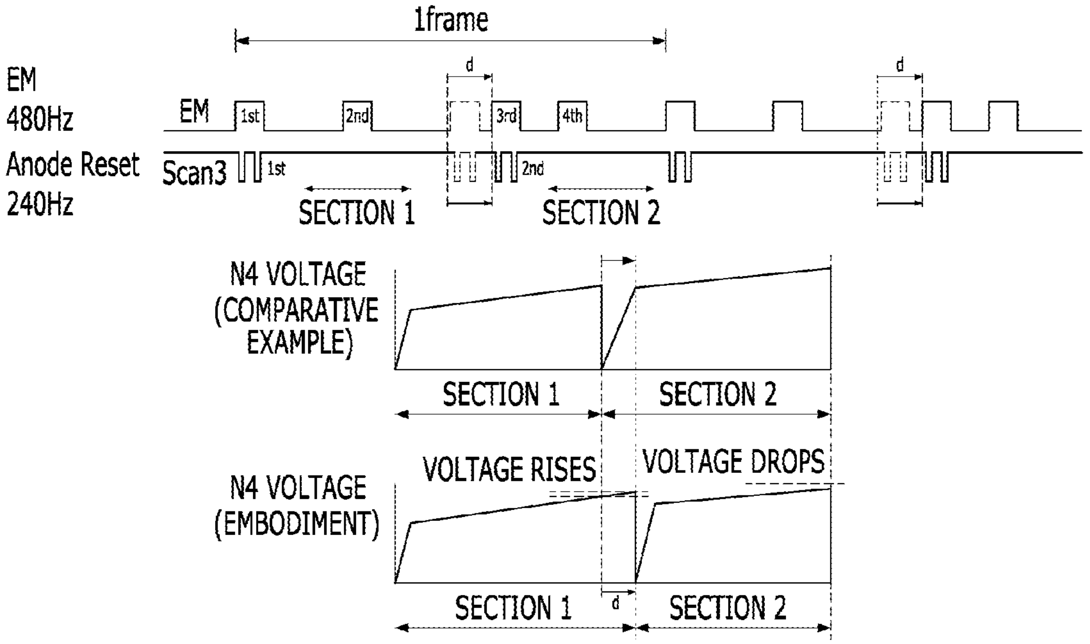
FIG. 8 is a diagram for describing a method of driving the light-emitting display device according to a first embodiment of the present disclosure.

FIG. 8 is a diagram for describing a method of driving the light-emitting display device according to a first embodiment of the present disclosure. The first embodiment of the present disclosure illustrates a method of equalizing luminance by adjusting delay times of EM driving and anode reset.

Referring to FIG. 8, when driving is performed at the EM driving frequency of 480 Hz and the anode reset frequency of 240 Hz, EM driving is performed four times (first to fourth), and anode reset is performed twice in one frame. Here, a luminance difference in each emission section may be reduced by delaying each of a second anode reset time and a third EM driving time corresponding thereto by a predetermined period d.

When EM driving and anode reset times are not adjusted according to a comparative example, lengths of section 1 in which light is emitted after first anode reset and section 2 in which light is emitted after second anode reset are the same. Since a discharging time is short, the voltage at the fourth node N4 to which the anode is connected continuously rises, and thus a current applied to the OLED increases. Accordingly, the luminance rises faster in section 2 than in section 1. Since the length of section 2 is the same as the length of section 1, the luminance in section 2 becomes greater than the luminance in section 1.

When each of the second anode reset time and the third EM driving time is delayed by a predetermined period d according to the embodiment, the length of section 1 is extended, and the length of section 2 is shortened. Accordingly, the voltage at the fourth node N4 in section 1 rises compared to the comparative example, and thus the luminance in section 1 increases. On the other hand, the voltage at the fourth node N4 in section 2 is lowered compared to the comparative example, and thus the luminance in section 2 decreases. As a result, since the luminance difference between the two sections is reduced, flickering may be relieved. Here, the delay period d may be set to a value capable of minimizing the luminance difference according to the size, characteristics, etc. of each panel. For example, the luminance may be adjusted by adjusting the second anode reset time and the third EM driving time by about several tens of pixel lines.

Figure 9:
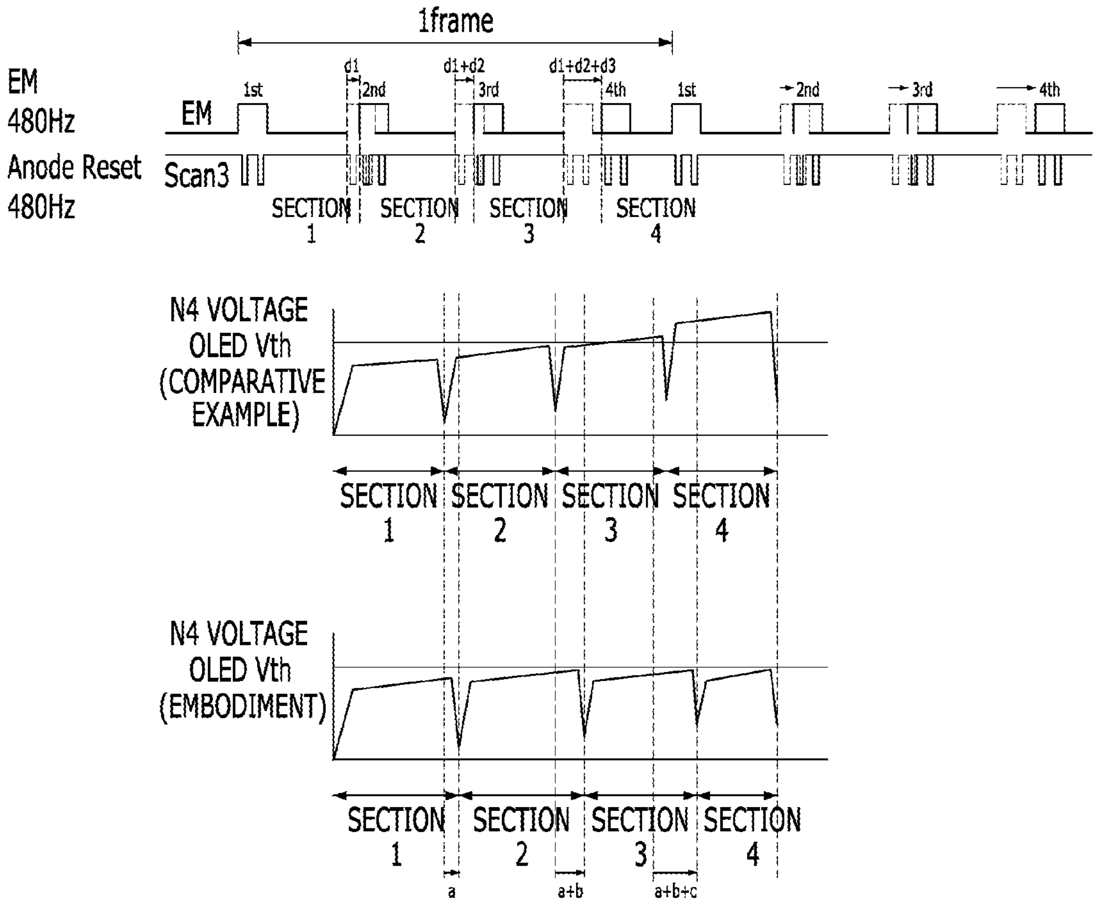
FIG. 9 is a diagram for describing a method of driving the light-emitting display device according to a second embodiment of the present disclosure.

FIG. 9 is a diagram for describing a method of driving the light-emitting display device according to a second embodiment of the present disclosure. The second embodiment of the present disclosure illustrates a method of equalizing luminance by gradually increasing delay times of EM driving and anode reset.

Referring to FIG. 9, when driving is performed at the EM driving frequency of 480 Hz and the anode reset frequency of 480 Hz, EM driving is performed four times, and anode reset is performed four times in one frame. Here, a luminance difference in each emission section may be reduced by gradually delaying times of second, third, and fourth anode reset and EM driving.

When EM driving and anode reset times are not adjusted according to a comparative example, lengths of sections 1 to 4 in which the OLED emits light are equal. During anode reset, the voltage at the fourth node N4 to which the anode of the OLED is connected is initialized, and then the voltage at the fourth node N4 increases in the emission section of each EM driving cycle. Here, as the number of times of EM driving increases, the current and voltage at the fourth node N4 gradually rise, and capacitance (overlap cap) is generated between the input line of the emission signal EM and the fourth node N4, so that the voltage at the fourth node N4 further rises. As a result, the voltage at the fourth node N4 may be higher than the threshold voltage OLED Vth of the OLED in section 4 in which light is emitted by the fourth EM driving cycle, and accordingly, the amount of current applied to the OLED increases, so that the luminance may be the highest in section 4.

When second, third, and fourth anode reset and EM driving times are gradually delayed according to the embodiment, a second operation may be delayed by a period a, a third operation may be delayed by a period a+b, and a fourth operation may be delayed by a period a+b+c. When lengths of four sections are equal, the luminance increases in a direction from section 1 to section 4. As a result, the luminance is highest in section 4. Therefore, the luminance difference among the four sections may be reduced using a method of extending the length of section 1 in which the luminance is relatively low to increase the luminance, and shortening the length of section 4 in which the luminance is high to decrease the luminance Values of a, b, and c may set so that section 2 and section 3 between section 1 and section 4 are set to be the same in length or section 2 is set to be longer than section 3.

Figure 10:
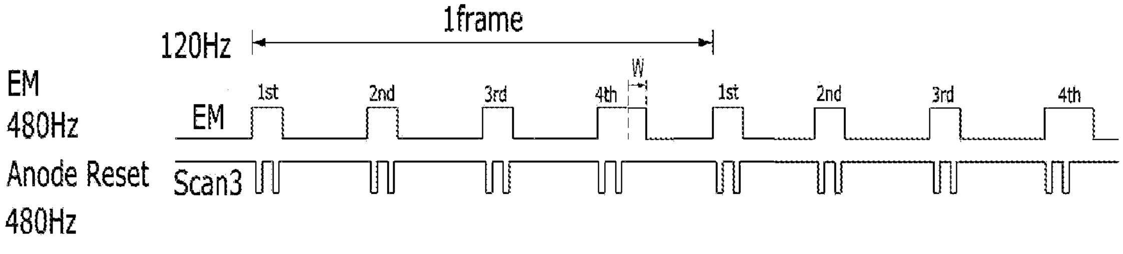
FIG. 10 is a diagram for describing a method of driving the light-emitting display device according to a third embodiment of the present disclosure.

FIG. 10 is a diagram for describing a method of driving the light-emitting display device according to a third embodiment of the present disclosure. The third embodiment of the present disclosure illustrates a method of relieving a luminance difference by controlling a width of the emission signal EM.

Referring to FIG. 10, when driving is performed at the EM driving frequency of 480 Hz and the anode reset frequency of 480 Hz, EM driving is performed four times, and anode reset is performed four times in one frame. As described above, as the number of times of EM driving and the number of times of anode reset increase, the current and the voltage at the fourth node N4 gradually rise, so that the luminance may be the highest in section 4.

In the third embodiment, the luminance difference in section 4 may be reduced using a method of shortening an emission period of section 4 in which the luminance is high to decrease the luminance. To perform EM driving, the emission signal EM is applied at a high level, which is an off voltage of each of the first emission control TFT ET1 and the second emission control TFT ET2, and then switched to a low level. Accordingly, by controlling the width W of the emission signal EM at the high level so that a time of application of the emission signal EM at the low level in section 4 decreases, it is possible to turn off the first emission control TFT ET1 and the second emission control TFT ET2 in an extended period to shorten an emission time in section 4. The luminance in section 4 may be reduced by shortening the emission time in section 4, so that it is possible to solve a problem in that the luminance in section 4 is excessively high when compared to other emission periods.

Figure 11:
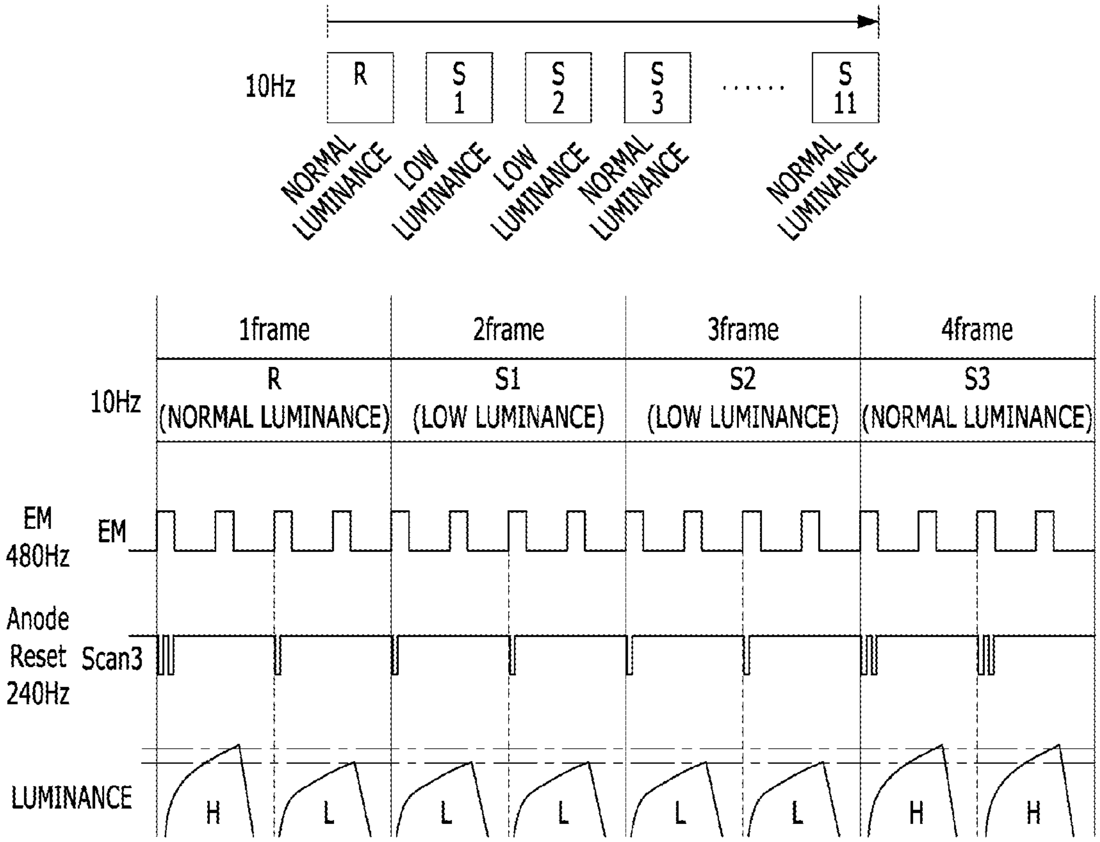
FIGS. 11 to 13 are diagrams for describing a method of driving the light-emitting display device according to a fourth embodiment of the present disclosure.
Figure 12:
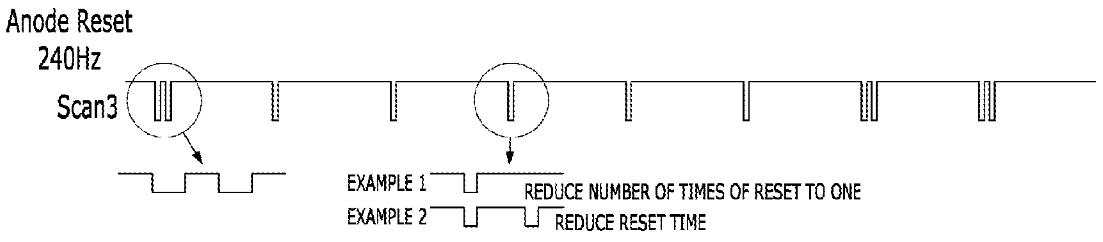
Figure 13:
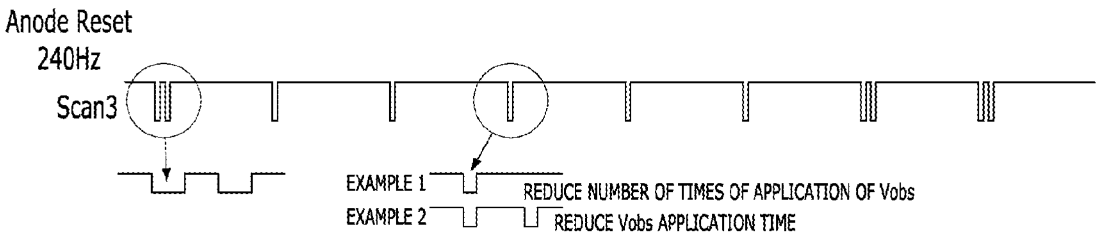

FIGS. 11 to 13 are diagrams for describing a method of driving the light-emitting display device according to a fourth embodiment of the present disclosure. The fourth embodiment of the present disclosure illustrates a method of controlling the number of times of anode reset, a width of an anode reset signal, etc. for each frame in order to relieve occurrence of a luminance difference between frames during VRR low-speed driving.

Referring to FIG. 11, during VRR driving, driving may be performed at a frame frequency of 10 Hz, an EM driving frequency of 480 Hz, and an anode reset frequency of 240 Hz.

When 10 Hz driving is performed during VRR driving, one image frame period may include one refresh frame R and 11 skip frames S1 to S11. Here, since the EM driving frequency is 480 Hz, and the anode reset frequency is 240 Hz, EM driving is performed four times (first to fourth), and anode reset is performed twice in each frame. Since a subpixel operation is different between the refresh frame R and the skip frames S1 to S11, a luminance difference may occur in each frame. For example, a luminance difference may occur among respective frames such that light is emitted at normal luminance in the refresh frame R, light is emitted at low luminance in the first skip frame S1 and the second skip frame S2, and light is emitted at normal luminance in the third skip frame S3. In order to relieve such a luminance difference among frames, the number of times of anode reset or an anode reset time may be adjusted in a frame in which luminance is low, so that the luminance in the corresponding frame may be increased.

Referring to FIG. 12, in a frame S1 or S2 in which the luminance is low, a voltage level at the fourth node N4 to which the anode is connected may be increased by reducing the number of times of anode reset performed in the non-emission period of each emission signal EM from two to one. As the voltage level at the fourth node N4 increases, the amount of current applied to the OLED also increases, so that the luminance in the corresponding frame may be improved. In addition, it is possible to improve the luminance in the corresponding frame by shortening the anode reset time and increasing the voltage level at the fourth node N4 to which the anode is connected.

Meanwhile, when the third scan signal Scan3 is applied during anode reset, not only is fourth switching TFT T4 that applies the anode reset voltage VAR for anode reset is on but the fifth switching TFT T5 that applies the OBS voltage Vobs to the first node N1 of the driving TFT DT is also turned on. When the OBS voltage Vobs is applied to the first node N1, the hysteresis of the driving TFT DT is changed, and thus the amount of current applied to the OLED is changed. Therefore, it is possible to improve the luminance in the corresponding frame by changing a method of applying the OBS voltage Vobs.

Referring to FIG. 13, in a frame in which the luminance is low, the amount of current applied by the driving TFT DT may be increased by reducing the number of times of application of the OBS voltage Vobs in the non-emission period of each emission signal EM from two to one. As the amount of current of the driving TFT DT increases, the amount of current applied to the OLED increases, and thus the luminance in the corresponding frame may be improved. In addition, it is possible to improve the luminance in the corresponding frame by shortening an application time of the OBS voltage Vobs and increasing the amount of current applied by the driving TFT DT.

As described above, in the embodiments of the present disclosure, occurrence of flickering may be prevented by controlling the anode reset timing, the number of times of anode reset, etc. in each frame according to the driving frequency of the emission signal EM to relive the luminance difference for each emission section. In addition, it is possible to provide a light-emitting display device capable of preventing occurrence of flickering and improving image quality by controlling the number of times of anode reset, the anode reset time, etc. in each frame during VRR driving to relieve the luminance difference among frames.

The embodiments of the present disclosure have the following effects.

The embodiments of the present disclosure may provide a light-emitting display device capable of relieving a luminance difference among respective emission periods to prevent occurrence of flickering and improve image quality when an emission signal is output a plurality of times and anode reset is performed in one frame period.

The embodiments of the present disclosure may provide a light-emitting display device capable of providing high image quality during low-power driving by relieving a luminance difference among respective frames to prevent occurrence of flickering when an emission signal is output a plurality of times and anode reset is performed in one frame period during VRR driving for reducing power consumption.

Effects according to the present disclosure are not limited by the contents illustrated above, and various more effects are included in this specification.

Through the above description, those skilled in the art will know that various changes and modifications are possible without departing from the technical spirit of the present disclosure.

What is claimed is:

1. A light-emitting display device comprising:

a display panel including a plurality of subpixels, each of the plurality of subpixels including a light-emitting element;

a data driver configured to supply a data voltage to each of the plurality of subpixels; and a scan driver configured to output an emission signal that controls a non-emission period and an emission period of the light-emitting element and a reset signal that controls a reset period of the light-emitting element, wherein the scan driver outputs the emission signal a plurality of times in one frame period via an emission line and outputs the reset signal in a non-emission period of the emission signal via a scan line that is different from the emission line, and wherein a length of an emission period before outputting of the reset signal is greater than a length of an emission period after outputting of the reset signal in the one frame period.

2. The light-emitting display device according to claim 1, wherein a plurality of emission signals output in the one frame period have non-emission periods of a same length.

3. The light-emitting display device according to claim 2, wherein a non-emission period corresponding to the outputting of the reset signal is delayed a predetermined time to extend the length of the emission period before outputting of the reset signal.

4. The light-emitting display device according to claim 1, wherein a last emission signal output in the one frame period has an emission period of a shortest length.

5. The light-emitting display device according to claim 2, wherein delay times of the non-emission periods of the plurality of emission signals output in the one frame period gradually increase.

6. The light-emitting display device according to claim 1, wherein the emission period after outputting of the reset signal is delayed a predetermined time to extend a length of a non-emission period corresponding to the outputting of the reset signal.

7. The light-emitting display device according to claim 1, wherein the scan driver is configured to perform a refresh frame driving that charges a subpixel from the plurality of subpixels with the data voltage and a skip frame driving that maintains the data voltage during a low-speed driving period, and outputs the emission signal a plurality of times in each of a refresh frame period and a skip frame period.

8. The light-emitting display device according to claim 7, wherein a number of reset signals output in the refresh frame period is greater than a number of reset signals output in the skip frame period.

9. The light-emitting display device according to claim 7, wherein a signal width of a reset signal output in the refresh frame period is greater than a signal width of a reset signal output in the skip frame period.

10. The light-emitting display device according to claim 1, wherein the light-emitting element is applied with an anode reset voltage during the reset period.

11. The light-emitting display device according to claim 1, wherein each of the plurality of subpixels further includes a driving thin film transistor (TFT) configured to apply a driving current to the light-emitting element, wherein the driving TFT is applied with an on-bias stress voltage during the reset period.

12. A light-emitting display device comprising:

a display panel including a plurality of subpixels, each of the plurality of subpixels including a light-emitting element;

a data driver configured to supply a data voltage to each of the plurality of subpixels; and a scan driver configured to output an emission signal that controls a non-emission period and an emission period of the light-emitting element and a reset signal that controls a reset period of the light-emitting element, wherein the scan driver is configured to output a plurality of emission signals and a plurality of reset signals in one frame period, each of the plurality of reset signals is output in a non-emission period of the emission signal, and wherein the plurality of reset signals output in a first frame and a second frame, respectively, are different in a sum of signal widths.

13. The light-emitting display device according to claim 12, wherein the plurality of reset signals output in the first frame and the second frame, respectively, are different in number.

14. The light-emitting display device according to claim 12, wherein each of the plurality of reset signals output in the first frame and each of the plurality of reset signals output in the second frame are different in signal width.

15. The light-emitting display device according to claim 12, wherein the first frame is a refresh frame during which the subpixels are charged with the data voltage, and the second frame is a skip frame during which the data voltage is maintained.

16. The light-emitting display device according to claim 12, wherein the light-emitting element is applied with an anode reset voltage during the reset period.

17. The light-emitting display device according to claim 12, wherein each of the plurality of subpixels further includes a driving thin film transistor (TFT) configured to apply a driving current to the light-emitting element, wherein the driving TFT is applied with an on-bias stress voltage during the reset period.

* * * * *